Jan. 7, 1936.    L. B. NEIGHBOUR    2,026,794
ELEVATOR
Filed March 31, 1933    3 Sheets-Sheet 1
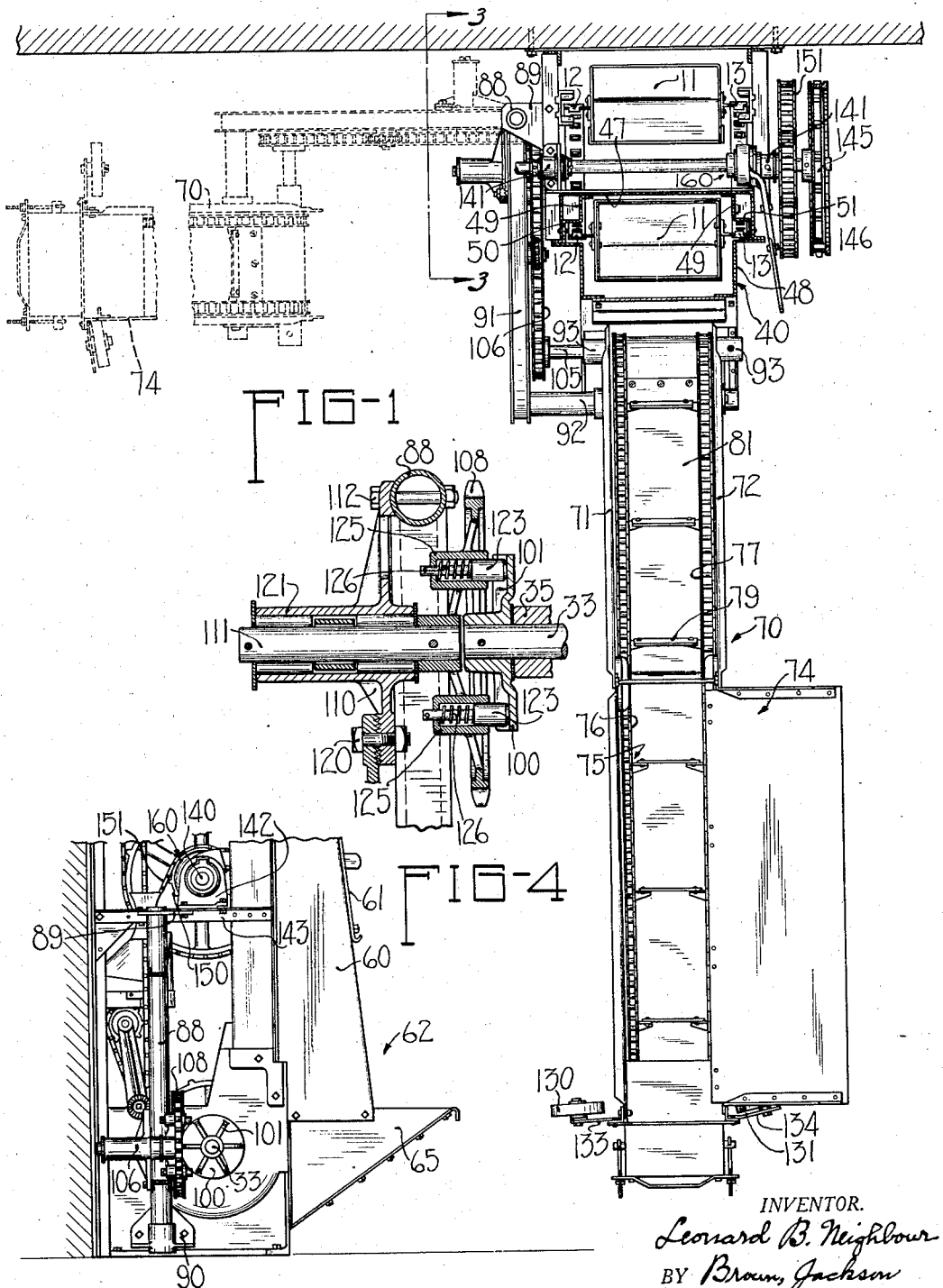
INVENTOR.
Leonard B. Neighbour
BY Braun, Jackson
Boettcher & Dienner
ATTORNEYS.
WITNESS
WALTER ACKERMAN

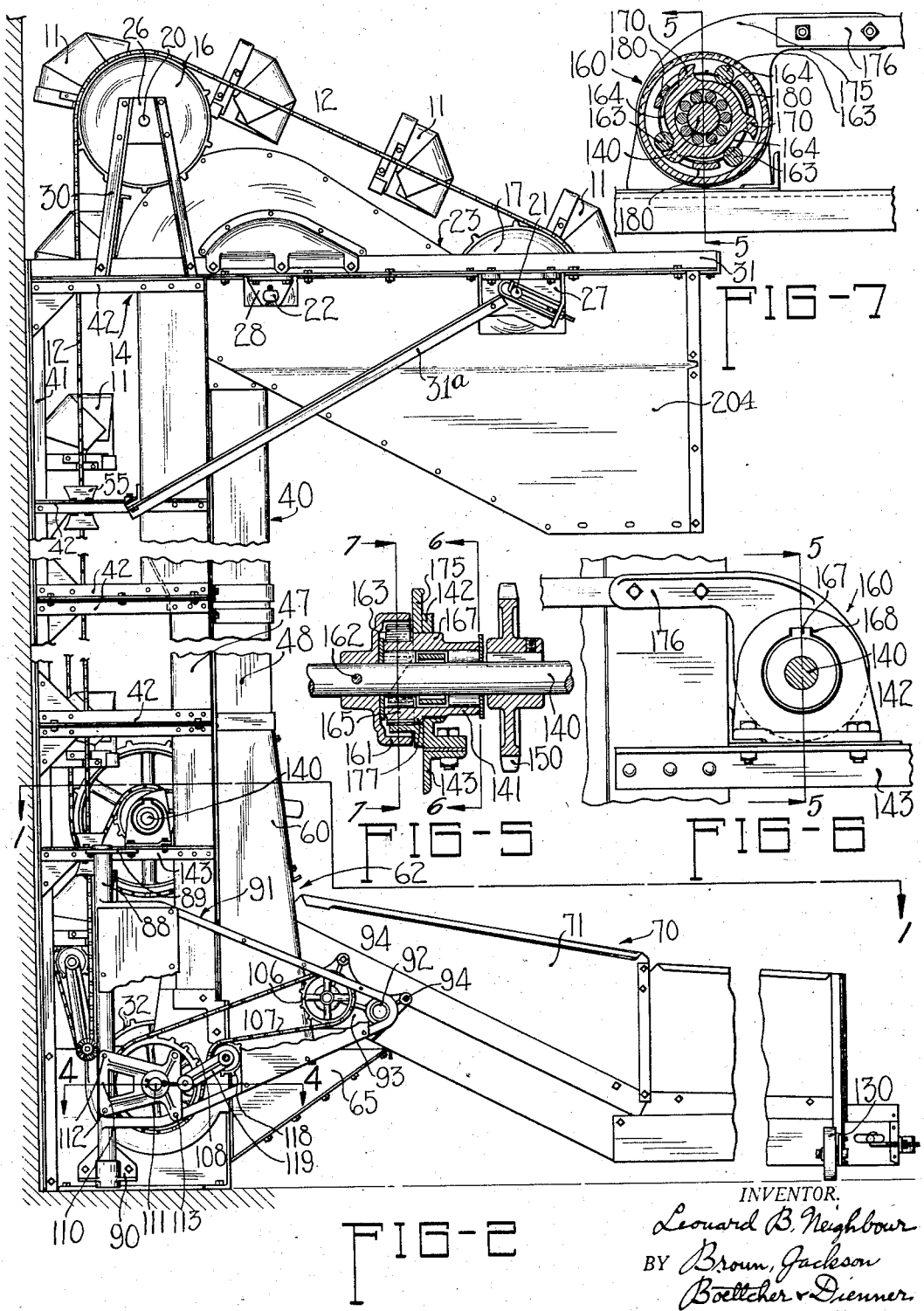

Jan. 7, 1936.  L. B. NEIGHBOUR  2,026,794
ELEVATOR
Filed March 31, 1933  3 Sheets-Sheet 3
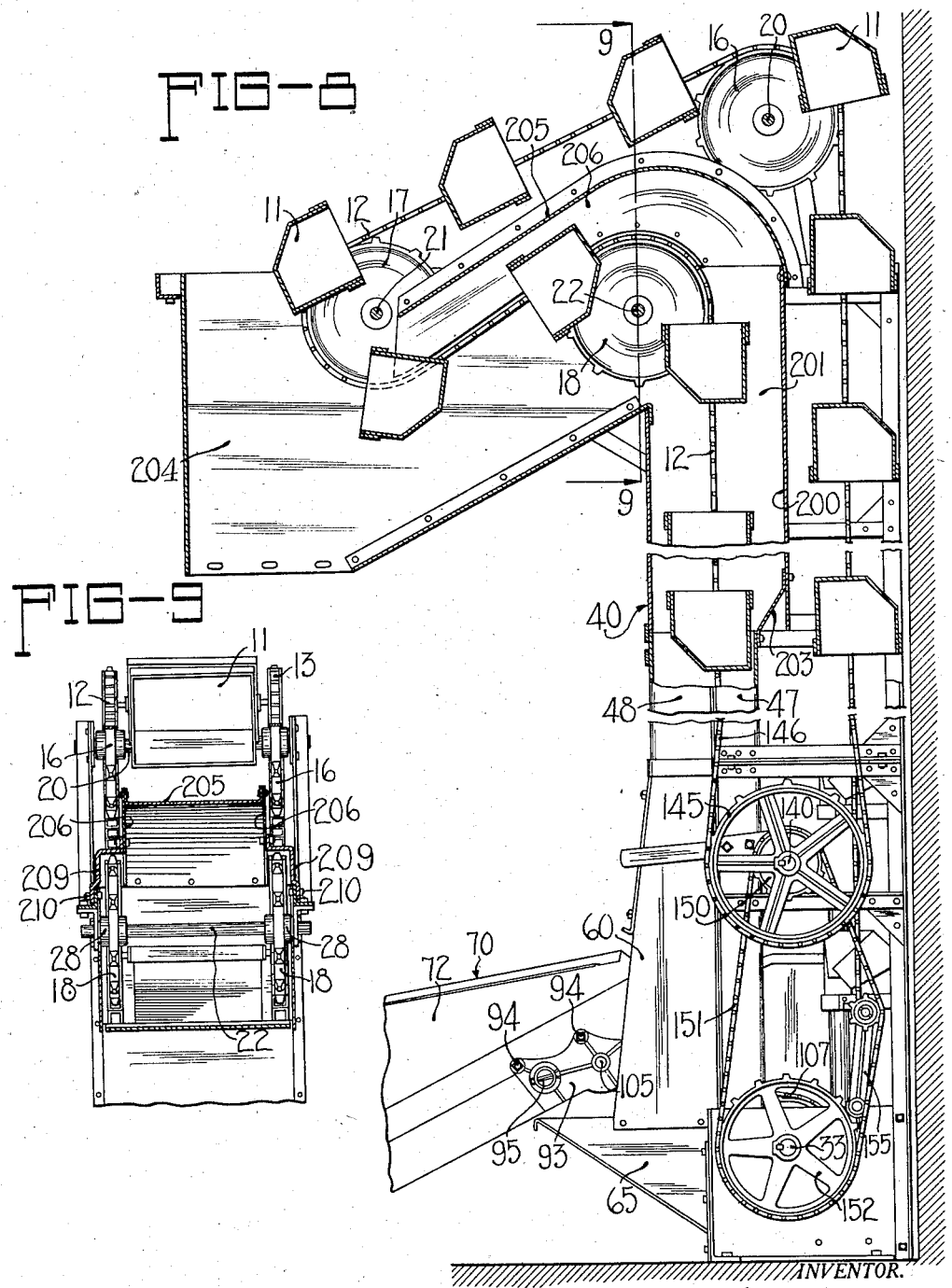
WITNESS.
EDWARD MELIN.
INVENTOR.
Leonard B. Neighbour
BY Brown, Jackson
Boettcher + Dienner
ATTORNEYS.

Patented Jan. 7, 1936

2,026,794

UNITED STATES PATENT OFFICE 2,026,794

ELEVATOR

Leonard B. Neighbour, Moline, Ill., assignor to Deere & Company, Moline, Ill., a corporation of Illinois Application March 31, 1933, Serial No. 663,685

20 Claims. (Cl. 198—55)

The present invention relates generally to elevators and particularly to elevators of the type used in cribs, granaries and the like for receiving grain from wagons and other vehicles and elevating the grain to the top of the crib or granary from which point the grain is distributed to the desired places by gravity.

Cribs, granaries and similar structures are commonly provided with a central driveway at or near the ground level with bins or compartments for receiving grain at either side of the central driveway as well as on the floor or floors above the driveway. Elevators of the type with which the present invention is particularly concerned are usually disposed in the driveway along one wall thereof and are adapted to receive the grain from the wagon and to raise it to a point near the roof of the crib or granary from which the grain flows to the proper storage compartment by gravity.

Elevators of this general type are usually built into the building and remain a permanent part thereof. In some elevators it is necessary to construct a pit or the like below the level of the driveway to receive portions of the operating mechanism of the elevator, as, for example, the horizontally operating conveyor which delivers grain from the wagon or from the storage pit into which the wagon discharges, to the vertically disposed elevator means proper. Other types of elevators are provided wherein a shiftable or portable receiving hopper is provided and which may be moved out of the way when the wagon or other vehicle is being moved up into position to discharge into the elevator, and when the wagon or other vehicle is properly positioned the receiving hopper may then be brought in such relation to the wagon or other vehicle that the grain therefrom is delivered into the hopper, the conveying mechanism of the latter then delivering the grain to the elevating means proper. Usually the latter mechanism includes some form of cup or bucket elevator wherein grain is received by the buckets during their uprun or ascending flight, the buckets discharging at the top of the crib or granary into a dumping hood, hopper, or the equivalent.

The elevator of the present invention is of the second type, namely, one wherein shiftable receiving hopper means are provided to receive the grain from the wagon or other vehicle but which can be disposed out of the way of the vehicle when the same is brought to position alongside the elevator. Elevators of this type have the advantage that they may be set up directly on the floor of the crib or granary without having to cut into or otherwise disturb the floor in any respect.

The principal object of the present invention is, therefore, to provide an elevator of this general type wherein improved shiftable receiving hopper means are provided which may be easily and conveniently shifted out of the way when driving the wagon up alongside the elevator. More particularly, the present invention contemplates providing receiving hopper means pivotally connected with the elevator frame at one side thereof so that the hopper may be swung laterally up close against the wall of the driveway so as to be entirely out of the way of the wagon or vehicle, but which may be, nevertheless, positioned so as to discharge directly into the front of the elevator buckets when the wagon is arranged to dump directly into the hopper.

Pivoted receiving hoppers for elevators and the like have been provided heretofore but, as far as applicant is aware, these pivoted receiving hoppers have been arranged so as to either pivot in front of the elevator casing, in which case a relatively wide driveway is required for the installation of such an elevator, or the pivoted hopper has been arranged with its pivotal axis at one side of the elevator, in which case the hopper discharged into one side of the elevator and not into the front thereof, as would be preferable, since where the grain is discharged into one side of the elevator, proper filling of the cups or buckets is not obtained.

Heretofore, also, relatively complicated drives have been relied upon to transmit motion from the elevator chains or driving mechanism therefor to the mechanism of the conveyor in the receiving hopper.

The present invention avoids all of these disadvantages by providing a hopper pivoted to one side of the elevator but arranged to swing into the front of the elevator so as to discharge thereinto, the conveyor mechanism of the receiving hopper being driven by improved and simplified driving connections which avoids the use of bevel gears and the like and which driving connections are also arranged to be automatically interrupted as soon as the receiving hopper is swung away from its front position and into a position closely alongside the wall of the driveway at one side of the elevator.

Another object of the present invention is therefore the provision of improved means for driving the conveyor mechanism of the receiving hopper, which driving means is arranged to be automatically disconnected when the receiving hopper is swung to one side to allow bringing the wagon or other vehicle up to position.

Still further, another object of the present invention is the provision of a pivotally mounted receiving hopper, pivotally connected with one side of the elevator frame and arranged to be positioned laterally so as to be completely out of the way of a vehicle being drawn up to the elevator, the receiving hopper also being adapted to be swung around in front of the elevator to receive grain from the wagon or other vehicle and to deliver the same into the front of the elevator, and in such a receiving hopper the present invention further contemplates the provision of improved connections between the receiving hopper and the elevator whereby the hopper may be arranged to be pivotally connected with the elevator at either side thereof. To this end, the present invention contemplates improved pivot frame means which can be attached to either side of the elevator frame. Preferably, the pivot frame is arranged so as to be reversed from one side of the elevator frame to the other to effect the optional mounting of the preceding hopper. Th pivot frame also preferably includes certain parts which are symmetrical about their longitudinal axis so as to facilitate the reversing of the hopper as desired.

Another object of the present invention is the provision of improved elevator structure which includes a framework in which the casing surrounding the ascending series of elevator buckets also serves as the supporting frame or at least the main portion thereof. By virtue of this construction, wherein the casing is made rigid enough to withstand the greater portion of the compression stresses incident to the weight of the elevator and the load carried thereby, a simplified framework is provided.

In connection with the casing which surrounds the ascending flight or buckets, the present invention contemplates a construction wherein the possibility of grain, especially ears of corn, becoming wedged back of a bucket or between the elevator chain and one of the upper sprockets is eliminated. Briefly, the present invention contemplates forming the upper portion of the casing with a set-back to allow any excess grain, such as ears of corn and the like, which may have been shaken off of a cup or bucket and which is carried up between the cup and the back of the casing, to fall away from that bucket and to be directed into the next lower bucket, and if this bucket is full the excess material will be directed by the set-back portion into the next lower bucket, and so on. Thus, no excess material will be carried up into the head of the elevator and it therefore becomes practically impossible for such material to interfere with the turn at the upper end. In addition, the present invention contemplates the provision of a special guard around the upper sprockets over which the elevator chain is trained, these guards serving to house the sprockets and to prevent grain, especially ears of corn, from coming in between the sprockets and the elevator chains.

Another important object of the present invention is the provision of a novel one-way brake or overrunning clutch in the drive for the elevator. It sometimes occurs that the power operating the elevator is suddenly or accidentally interrupted, and in such cases the weight of the filled buckets, overbalancing the weight of the empty buckets on the down-run, causes the elevator to run backwards, and when this is permitted each bucket empties itself into the bottom boot of the elevator until the boot becomes filled and jammed. This prevents further backward rotation of the elevator but may cause damage to the mechanism thereof. Further, in any case, it is not an easy task to clear the elevator and to remove the jammed material so as to put the elevator back into operation.

However, there are times when it is necessary and desirable to let the elevator run backwards a certain amount. For example, should the elevator chains break at some point on the ascending run, allowing the buckets below the break to fall down into the boot, it is desirable to run the elevator backwards slowly while cleaning out the hopper at the same time to prevent clogging.

With these factors in mind, the present invention contemplates the provision of a one-way brake or overrunning clutch in the drive for the elevator so as to prevent it from running backwards except when desired, and it is also the further object to provide means whereby the amount of backward movement can be controlled.

These and other objects of the present invention will be apparent from the following description of the preferred structural embodiment, taken in conjunction with the accompanying drawings illustrating such embodiment and in which:

Figure 1 is a top view taken along the line 1—1 of Figure 2 below the upper dumping head of the elevator and looking downwardly on the receiving hopper, the latter being shown in full lines in its front or discharging position, while in dotted lines the hopper has been indicated in its lateral position when it has been swung to one side of the elevator to permit the passage of a wagon or other vehicle into position adjacent the elevator, the wagon being drawn up from left to right as viewed in Figure 1;

Figure 2 is a side elevation of the elevator shown in Figure 1 and illustrating the receiving hopper in position to discharge grain into the front of the elevator chute;

Figure 3 is a fragmentary elevation corresponding to a view taken along the line 3—3 of Figure 1 and similar to Figure 2 but showing the position of the pivot frame of the hopper when the latter has been swung to one side of the elevator away from the front thereof so as to permit drawing a wagon or other vehicle alongside the elevator;

Figure 4 is a fragmentary horizontal section taken through the automatically releasable driving connections between the driving means for the elevator and the driving means for the conveyor of the hopper and corresponding to a section taken along the line 4—4 of Figure 2;

Figure 5 is a section taken along the line 5—5 of Figures 6 and 7 through the one-way brake interposed in the driving connections for the elevator;

Figure 6 is a section taken along the line 6—6 of Figure 5;

Figure 7 is a section taken along the line 7—7 of Figure 5;

Figure 8 is a vertical view, partly in section and partly in elevation and looking toward the right hand side of the elevator; and Figure 9 is a section taken along the line 9—9 of Figure 8.

Referring now to the drawings, the elevator of the present invention comprises the usual form of cups or buckets 11 fixed at their ends to two endless elevated chains 12 and 13 arranged at opposite sides of the frame 14 of the elevator. The frame 14 is disposed in a vertical position and thereby positions the buckets 11 in a vertically arranged series having an ascending flight or run adapted to convey material upwardly and a descending or down-run. At their upper portions the elevator chains 12 and 13 are trained over pairs of supporting sprockets 16, 17 and 18, see Figures 2 and 8, journaled on shafts 20, 21 and 22 respectively. These shafts are mounted in the framework of the elevator head 23 by suitable bearing means 26, 27 and 28 of more or less conventional construction, the bearings 26 being carried by bracket means 30 supported upon the horizontal angle member 31 of the elevator head 23 while the bearing means 27 is preferably constructed and arranged to be adjusted so as to maintain the proper tension in the elevator chains 12 and 13.

At their lower portions the elevator chains 12 and 13 are trained over a pair of driving sprockets 32 fixed on a driving shaft 33, the latter being journaled in bearings 35 in the lower end of the elevator, as best shown in Figure 4.

The framework 14 consists principally of a vertically disposed casing 40 arranged to enclose the vertical series of ascending interconnected buckets 11, this casing being reinforced by suitable vertical angles 41 and horizontal bars 42. Preferably, the casing 40 consists of a plurality of sections, each of which is formed of two parts 47 and 48, and each part is of U-shaped cross section, the flanges or sides of which are bolted together to form the completed casing section, as best shown in Figure 1. The inner casing part 47 is somewhat wider than the casing part 48, and in the corners of the casing part 47 there are provided angularly bent filler members 49. These members serve not only to give the casing 40 greater column strength but also to form a substantially rectangular shaped enclosure with recesses 50 and 51 for receiving the elevator chains 12 and 13.

By virtue of this construction the bucket casing, comprising the members 47, 48, and 49, forms a rigid structure having sufficient strength and stiffness to withstand the compression stresses involved incident to the support and operation of the elevator mechanism. Preferably, the casing 40 is so arranged so as to support the major portion of the weight of the elevating mechanism but, as pointed out above, the angle bars 41 and 42 serve to add further rigidity to the elevator frame, serving as side frame members in connection therewith, and they also provide means for securing the elevator to the side wall of the crib in spaced relation so as to provide a passageway for the descending run of buckets. The various sections of the casing 40, which may be separate before assembly, preferably have corresponding sections of the vertical angle bar 41 secured thereto at the bottom and top thereof by the short transverse bars 42. When the elevator frame is assembled, the horizontal legs of the transverse angle bars 42 serve as convenient securing means for fastening the sections together. In this way, elevators of various heights may be constructed from substantially the same sections. The vertical and horizontal angle bars connected with the various casing sections are preferably braced and connected together by suitable gusset plates or the equivalent. Certain of the transverse bars 42 may also be utilized as convenient supports for guides 55 for the descending run of elevator chains, as best shown in Figure 2.

The lower portion of the casing 40 terminates in an elevator boot 60, and this boot has an open front closed by a cover plate 61 and terminating in a grain receiving opening 62. A chute 65 is secured to the lower end of the boot 60 and serves to direct grain discharged into it to the ascending buckets 11.

The horizontally disposed receiving hopper, which is adapted to receive grain from wagons and other vehicles draw alongside the elevator and to discharge the same into the chute of the elevator boot, is indicated in its entirety by the reference numeral 70. The receiving hopper 70 comprises the usual side walls 71 and 72, either of which is adapted to receive a reversible chute 74 arranged to direct material into the receiving hopper, and between the walls 71 and 72 a conveyor mechanism 75 is provided.

The conveyor 75 is more or less of conventional construction and comprises a pair of endless chains 76 and 77 connected together by transverse members 79 which operate over a bottom 81. Preferably, the reversible chute 74 is pivotally connected so as to be swung to a vertical position to provide additional clearance when the conveyor is arranged to one side of the elevator in its inoperative position, as indicated in dotted lines in Figure 1.

As best shown in Figures 2 and 8, the inner end of the hopper 70 is inclined upwardly and is positioned to deliver material into the chute 65 in the lower section of the elevator boot. The inner end of the receiving hopper 70 is pivotally supported on the lower end of the elevator proper to accommodate the horizontal swinging movement of the hopper from its operative or grain receiving position to its inoperative position at one side of the elevator and closely adjacent the wall of the crib to which the elevator frame is secured. For this purpose, the inner end of the hopper 70 is supported on the lower section of the elevator through a connection therewith which includes a vertically disposed pipe member 88 which is journaled in bracket members 89 and 90 adapted to be secured to either side of the elevator frame, the hopper 70 being shown in Figure 2 as connected to the left side. A substantially V-shaped frame 91 is fixed to the pipe member 88 and is provided with a transversely and horizontally disposed pipe section 92 fixed thereto at the apex of the V-shaped frame. The horizontal pipe section 92 forms a pivotal support for the receiving hopper 70, and for this purpose the latter is provided with a bearing member 93 at each side thereof and securely fixed thereto by bolts 94 or the like. The conveyor 70 is held in position on the supporting pipe 92 by means of a cotter pin 95 or the like.

The receiving hopper 70, by virtue of having its inner end supported on the pivot frame 91, can be swung from its inoperative position, shown in dotted lines in Figure 1, to its operative position, shown in full lines, and the present invention contemplates providing a driving connection from the drive shaft 33 of the elevator to the conveyor 75 so that when the hopper 70 is in its receiving position the conveyor 75 is actuated, but when the hopper 70 is in its inoperative position such driving connections are automatically interrupted. This automatically releasable driving connection is best shown in Figures 3 and 4. Preferably, the drive for the conveyor 75 is derived from one end of the drive shaft 33. To this end of the drive shaft 33 there is secured a plate 100 (Figures 3 and 4) which has a plurality of radial flanges 101 disposed in axial planes on the outer face of the plate.

The conveyor chains 76 and 77 are trained over two sprockets which are fixed to a drive shaft 105 journaled in the bearing members 93 and to one end of which is fixed a sprocket 106, as best shown in Figure 2. This sprocket is driven from a drive chain 107 trained around it and around a driving sprocket 108 journaled in a supporting casting 110 by means of a stub shaft 111. The casting 110 is fixed in position by being bolted to the pipe member 88 and to one leg of the V-shaped frame 91, as by bolts 112 and 113. To take up the slack in the driving chain 107, an idler sprocket 118 is provided and which is mounted on an arm 119 pivoted to the casting 110, as by means of a bolt 120. The sprockets 106 and 108 and the driving chain 107 are disposed in substantially the same vertical plane as the V-shaped frame 91 and its pivotal supports 89 and 90. By virtue of this construction, there are substantially no undesirable moment stresses set up in the supporting frame 91 and the laterally extending supporting pipe 92 in the operation of driving the conveyor 75.

The casting 110 is provided with an outwardly extending journal portion 121 and is fixed in position so as to dispose the stub shaft, rotatably mounted in said journal portion, in substantially axial alignment with respect to the driving shaft 33, as best indicated in Figure 4. This disposes the sprocket 108 closely adjacent the plate 100 described above. Suitable cooperative clutch elements are provided so as to nonrotatably connect these parts, and in the preferred construction these clutch elements include the radial flanges 101 and suitable spring pressed plungers 123 slidably received in sockets 125 formed in the body of the sprocket 108 and biased for outward movement therein by spring means 126. As many plungers 123 may be provided as desired, but preferably there are two. An important feature of this construction, present also where more than two plungers are provided, is that the stub shaft 111 can be out of alignment with respect to the driving shaft 33 to a considerable extent without materially affecting the driving connections by which the conveyor of the receiving hopper is driven from the elevator mechanism.

As shown in Figure 4, the plungers 123 are preferably cylindrical and are rotatable in their sockets 125, and when the shafts 33 and 111 are out of alignment a rolling action takes place between the pins or plungers 123 and the flanges 101 on the plate member 100. This materially reduces the friction losses at this point. The stub shaft 111 has been described as journaled in the journal portion 121 of the casting 110, but if desired, the stub shaft 111 could be fixed in the casting 110 and the sprocket 108 journaled for rotation on the shaft.

When the receiving hopper 70 is swung from its inoperative position, shown in dotted lines in Figure 1, to its operative position, as shown in full lines in Figures 1, 2 and 4, the plungers 123 are brought into the spaces between the ribs 101, so that when the driving shaft 33 is rotated, the sides of the flanges will engage the plungers 123 and cause the sprockets 108 to rotate with the shaft 33, thereby driving, through the chain 107, the conveyor mechanism 75 of the hopper. The sockets 125 are arranged to permit the plungers 123 to recede therein in case the plungers engage the edges of the flanges 101 when the conveyor is first moved into its operative position. As is obvious, as soon as the receiving hopper is pivotally swung away from its operative position in front of the elevator, the driving connection between the shaft 33 of the elevator mechanism and the conveyor mechanism 75 is automatically interrupted by virtue of the plungers moving with the sprocket and out of engagement with the plate 100 fixed to the driving shaft 33.

To facilitate the swinging of the receiving hopper 70 from its operative position in front of the elevator to its inoperative position at one side thereof and up against the wall of the crib, the outer end of the hopper is supported on two rollers 130 and 131 journaled on brackets 133 and 134 for rotation about axes which intersect the vertical axis of the hopper connection defined by the pipe or spindle member 88.

The elevator buckets are driven from a jack shaft 140 journaled in bearings 141 supported in brackets 142 carried by two angle bars 143 forming a part of the frame of the elevator, and both having means, as will be described later, for receiving the plate or bracket 89. Power may be delivered to the shaft 140 in any desired manner, as for example, by means of a drive sprocket 145 mounted on the shaft and driven by means of a drive chain 146 connected with any convenient source of power.

Power is delivered from the jack shaft 140 to the driving shaft 33 of the elevator mechanism by means of a sprocket 150 mounted on the jack shaft 140 and connected by means of a driving chain 151 with a sprocket 152 fixed to the shaft 33, as best shown in Figure 8. A chain tightener 155 is provided for the purpose of maintaining the proper tension in the driving chain 151.

The hopper 70 is adapted to be pivotally connected at either side of the elevator frame so as to permit swinging the hopper to a position alongside the frame of the elevator, either on the right side or on the left side thereof, depending upon the direction in which it is desired to bring the loaded wagons up to the elevator. If, for example, the wagons are to be driven up from the left, as viewed in Figure 1, the hopper will be pivotally connected with the elevator frame on the left side, as shown in Figure 1, so that when the wagon is driven up the hopper 70 can be swung around against the wall on the left side of the elevator and then, when the wagon is properly positioned, the the hopper 70 can be swung around under the rear end of the wagon or other vehicle to receive the grain therefrom.

If the wagons are to be brought up from the other direction, it is desirable to arrange the hopper to be pivotally supported on the right side of the elevator so that the same can be swung against the wall of the crib at the right side of the elevator. For this purpose, the drive shaft 33 is arranged so that it can be reversed in its bearings to position the driving sprocket 152 on the left side of the elevator and out of the way of the hopper connections on the right side. Likewise, the sprocket 150 and the driving chain 151 can be arranged on the left side of the elevator. This reversal also disposes the flanged plate 100 on the right side of the elevator.

The V-shaped pivot frame 91 is, as will be clear from Figure 2, symmetrical about a longitudinal axis, and the brackets 89 and 90 can be disposed on the other or right side of the elevator to receive the pivot frame on that side. The supporting pipe section 92 can also be reversed, as can the shaft 105 and the sprocket chain 106 associated therewith. It is also to be noted that the casting 110 is symmetrical about a longitudinal center line so that this member can also be reversed when the pivot frame 91 is mounted on the other side of the elevator.

By virtue of this construction, it is a simple matter to arrange the hopper to be pivotally supported from either side of the elevator, either when first installing the same in a crib or if it should be subsequently desired to change the mounting of the hopper.

As mentioned above, in ordinary elevators if the power driving the same is suddenly interrupted the series of interconnected buckets tends to move backwardly, due to the weight of the material in the buckets on the ascending flight. If this is permitted to occur, the result is that the boot at the lower end of the elevator becomes clogged and jammed and there is considerable likelihood that the elevator will become damaged. To prevent the elevator from running backwards in case the power goes off, the present invention contemplates the provision of a one-way brake or overrunning clutch associated with one of the shafts driving the elevator chains and so arranged that no backward rotation of these shafts is permitted unless such backward movement is actually desired.

The one-way brake is indicated in its entirety by the reference numeral 160 and comprises, as best shown in Figures 5, 6, and 7, a ring 161 fixed to the shaft 140 by a pin or key 162 inserted in suitable openings in the shaft 140 and in the hub of the ring member 161. A series of rollers 163 are disposed between the inner circumferential portion of the ring member 161 and cam sections 164 formed on the outer circumference of the hub portion 165 of the bearing 141. The bearing 141 is held against rotation with respect to the elevator frame by means of a lug 167 formed integral therewith and engaging a notch 168 provided in the bracket 142 supporting the bearing.

The cam sections 164 are separated by abutment lugs 170, the cam sections 164 being arcuate eccentrically with respect to the axis of the ring member 161, and the low points of the cam sections are spaced from the inner circumference of the ring member 161 a distance somewhat greater than the diameter of the rollers 163, but the high points of these sections are spaced from the inner circumference of the ring member 161 a distance which is slightly less than the diameter of the rollers 163. As a result of this arrangement, the shaft 140 with the ring member 161 attached thereto is free to turn in one direction with respect to the relatively fixed bearing support 141, this direction being indicated by the arrow in Figure 7, but the shaft 140 and the ring member 161 are prevented from turning in the opposite direction by virtue of the rollers 163 wedging in between the inner circumference of the ring portion 161 and the high points of the cam sections 164 when backward rotation tends to occur, thereby preventing any appreciable rotation of the shaft 140 backwardly. The direction in which the shaft 140 is free to rotate is, of course, that direction in which the elevator and the conveyor will be operated properly. Thus, should the power to the elevator be suddenly interrupted for any reason, the one-way brake will immediately act to prevent any backward movement of the filled buckets.

There may be times, however, as explained above, when it is desirable to permit the elevator to run in the opposite direction, and to provide a construction permitting the controlled backward movement of the elevator, the present invention provides a release device arranged to disable the one-way brake. This release device comprises a rotatable member in the form of a plate 175 provided with an operating arm 176 and journaled over an enlarged portion 177 of the bearing 141. This plate carries projecting fingers 180 which extend between each of the rollers 163 and the high point of the associated cam section 164.

The plate member 175 can be rotated into the position shown in Figure 7 in which the fingers 180 are withdrawn sufficiently from the roller 163 to allow them to wedge between the ring member 161 and the bearing 141, or the plate 175 may be rotated in a counterclockwise direction, as viewed in Figure 7, so that the rollers 163 can be held against the separating lugs 170, thereby preventing the rollers from wedging in between the ring member 161 and the bearing 141. When the rollers are held in such position, the shaft 140 is free to rotate in either direction.

Referring now more particularly to Figure 8 it will be observed that the back wall of the casing part 47 is disposed closely adjacent the back wall of the ascending series of buckets, and it will also be observed that the top section or head 200 is set back beyond the position of the rear wall of the intermediate and lower sections to provide a space 201 between the rear side of the buckets and the wall or wheel section 200. The lower end of the section 200 is connected with the rear wall of the next lower section by means of an inclined plate 203. This arrangement permits grain, and particularly ears of corn and the like, which may have been carried up between the rear side of a bucket and the rear wall of the section 47 to escape past that bucket and move into the space 201, being directed by the wall 200 and the inclined portion 203 thereof into the next succeeding bucket. If that bucket is completely filled the excess material escapes therefrom and is directed into the next lower bucket. By virtue of this construction there is little likelihood that any material, other than that actually contained within the buckets, will be carried upwardly into the upper head of the elevator.

The head frame 23 of the elevator is provided with a dumping hood 204, this hood being supported from the horizontal bars 31 and the brace members 31a thereof, and a distributing spout of conventional construction is adapted to be secured to the discharge opening of the dumping hood 204. The casing surrounding the ascending run of buckets is continued into the dumping hood 204 by virtue of a scroll sheet or curved enclosure 205 and sidewalls 206 connected therewith. To each of the horizontal bars 31 at the sides of the elevator frame is secured a supporting casting 209 by bolt means 210, as best shown in Figure 2, and these castings embrace the adjacent sprockets 18 and support the side walls 206 so as to dispose them in planes which are spaced inwardly of said sprockets. The side walls or side members 206 are fixed to the inner side of the castings 209 and extend downwardly in parallel relationship with respect to the lower run of the elevator chains 12 and 13 inside the sprockets 17 and to a point adjacent the shaft 21 carrying these sprockets. As will be clear from Figure 8, as the ascending buckets 11 move upwardly and over the sprockets 18 to discharge material into the dumping hood 204, the side members 206 effectively prevent ears of corn and the like from falling in between the lower run of the chains 12 and 13 and the sprockets 17.

The operation of construction described above is believed to be apparent from the foregoing description. As the wagon or vehicle containing grain to be stored is brought up to position alongside the elevator, the receiving hopper 70 is disposed up against the crib wall, as indicated in dotted lines in Figure 1. The pivotal connections between the receiving hopper 70 and the elevator frame are such that the hopper may be optionally supported from the other side of the elevator frame, if desired, in which case the hopper can be swung against the crib wall at the right side of the elevator. After the wagon has been brought to its proper position, the hopper 70 is swung around to a position in front of the elevator, which position automatically engages the drive for the conveyor of the hopper with the driving mechanism for the elevator. The drop side or chute 74 may, of course, be disposed on either side of the hopper 70, depending upon how the hopper is pivotally connected with the elevator frame. The operation of the conveyor mechanism in the hopper feeds material into the chute 65 of the elevator hood, from which point the material is discharged into the ascending series of buckets 11. Rotation of the driving shaft of the elevator mechanism causes the buckets in the casing 40 to be moved upwardly and, while passing around the sprockets 18, the buckets are dumped to discharge their contents into the hopper or dumping head 204.

If, at this time, the power should be suddenly interrupted, the one-way brake 160 is immediately operative to prevent the backward movement of the filled buckets, the elevator mechanism being held in the position it occupied at the moment the power was interrupted. If, for any reason, it should be desirable to permit or to move the normally ascending series of buckets 11 downwardly, the lever 176 can be raised, which movement swings the fingers against the rollers 163 and frees the ring member carried by the shaft 140 from the relatively stationary member 141, thereby allowing the shaft 142 to rotate backwardly.

Any material spilling over from any of the buckets from the forward edge is directed downwardly by the forward casing sections 48 back into the chute 65, and any grain spilling over the rear of the buckets after they pass the inclined wall 203, or any ears of corn or the like which have been carried upwardly by the ascending buckets moving the same up the inner wall of the sections 47, will spill over into the space 201 from which such excess material will be directed by the set-back section 200 into one of the next lower buckets. The side walls 206, being disposed in planes inside of the sprockets 18, serve to keep any material from getting in between the sprockets 17 and the elevator chains 12 and 13.

It is important to note that by virtue of the construction described above, the elevator of the present invention can be installed in a crib without disturbing the floor of the driveway and without requiring the driveway to be excessively wide. In the present invention, the driveway need be wide enough only to accommodate the width of the wagon or the vehicle and the distance which the vertical elevator proper extends outwardly from the crib wall to which it is attached.

While I have described above the preferred structure in which the principles of my invention have been embodied, it is to be understood that my invention is not to be limited to the specific means shown and described but that, in fact, widely different means may be employed in the practice of the broader aspects of my invention.

What I claim, therefore, and desire to secure by Letters Patent is:

1. An inside elevator for grain and the like comprising a vertically disposed frame, a vertical series of buckets supported thereby, and a receiving hopper adapted to be pivotally connected at either side of the elevator frame adjacent the rear thereof and to be swingable from a position at either side thereof and rearwardly of the plane of the front face of said frame to a position in front of said plane to discharge grain into said buckets at the front of the elevator.

2. An inside elevator for grain and the like comprising a vertically disposed frame including spaced side members, a vertically arranged series of elevator buckets disposed between said side members, a receiving hopper adapted to be disposed in front of said buckets to discharge grain therein, and means pivotally connecting said hopper with the rear portion of one of said side members whereby when the hopper is swung through substantially 90° away from a position in front of the elevator, the side of the hopper opposite its pivot lies near the plane of the front face of the elevator.

3. An inside elevator for grain and the like comprising a vertically disposed frame including side members, a vertically arranged series of buckets disposed between said side members, means adjacent the lower end of said frame for driving said series of buckets, a receiving hopper pivotally connected with one of said side members adjacent the rear thereof and swingable from a position at one side of and substantially behind the plane of the front of said frame to a position directly in front thereof so as to discharge into said buckets, said hopper including a horizontally disposed conveyor, and means for driving said conveyor from said first named driving means when said hopper is disposed in front of said buckets.

4. An elevator for grain and the like comprising a vertically disposed frame, a vertical series of interconnected buckets supported in said frame, means for driving said buckets including a shaft journaled in each side of said frame, a receiving hopper including a horizontal conveyor, a supporting frame for said hopper including a part disposed at one side thereof and pivotally connected to one side of said frame, said hopper being swingable from a position at the side of said frame to a position in front thereof so as to discharge directly into said buckets, and means for driving said conveyor and engageable with said driving shaft for said buckets when said hopper is swung into operative position in front of said frame.

5. An elevator for grain and the like comprising a vertically disposed frame, a vertical series of interconnected buckets supported thereby, means for driving said buckets including a shaft journaled in each side of said frame and having one end extending laterally therefrom, a receiving hopper including conveyor means, a pivot frame connected with said hopper at one side thereof and pivotally connected with one side of said vertical frame for movement about a substantially vertical axis in rear of said driving shaft for the buckets, driving means for said conveyor means including a rotatable member mounted on said pivot frame, and complementary means on the extended end of said shaft and engageable with the rotatable member on said pivot frame when the hopper is swung to a position in front of the elevator frame to effect a driving connection between said drive shafts for the buckets and said horizontal conveyor means, whereby said hopper discharges directly into said buckets at the front of the elevator frame.

6. An elevator for grain and the like comprising a vertically disposed frame including spaced side members, a vertically arranged series of interconnected buckets disposed between said side members, means at the upper and lower ends of said frame for supporting said series of buckets and including a horizontal drive shaft journaled in said side members, a casing for the up-run of said series of buckets and including an opening in the lower end at the front of said frame for receiving grain and the like, a receiving hopper including a horizontal conveyor, a pivot frame secured to one side of said hopper and pivotally connected with one of said side frame members adjacent one end of said drive shaft for horizontal swinging about a substantially vertical axis, a clutch member carried by said end of the driving shaft and including radially extending teeth, and means for driving said horizontal conveyor including a second clutch member journaled on said pivot frame and including portions adapted to engage with the teeth on said first clutch member when the receiving hopper is swung to its discharge position in front of said opening.

7. An elevator for grain and the like comprising a vertically disposed frame including spaced side members, a vertically arranged series of interconnected buckets between said side members, sprocket means at the upper and lower ends of said frame for supporting said series of buckets, means for driving said buckets including a longitudinally disposed drive shaft journalled in said side members and extending therefrom at one end, said drive shaft being reversible so as to be disposed with its extended end at the other side of said frame, a casing for the ascending run of said buckets and provided with a receiving opening adjacent its lower end, a receiving hopper including horizontally movable conveyor means for feeding material to said buckets, means adapted to be connected with said hopper at either side thereof and also adapted to be connected with either of said side frame members for pivotally supporting said receiving hopper for horizontal swinging about a vertical axis disposed adjacent the axis of said drive shaft, means for driving the conveyor including a reversible member mounted on said last named means, and means disposed on said extended end of the drive shaft and adapted to be engaged by said rotatable member when said receiving hopper has been swung from a lateral position to a position in front of said receiving opening, whereby operation of said driving shaft serves to drive said horizontal conveyor when the latter is disposed in front of the buckets, said driving connection being automatically interrupted when said receiving hopper is swung to one side of said frame.

8. An elevator for grain and the like comprising a frame, a vertically disposed series of elevator buckets carried thereby, a horizontal conveyor adapted to be swung into and out of a position in front of the elevator frame and adapted to discharge into the front of said buckets, a pair of vertically spaced brackets adapted to be attached to either side of said frame, a pivot frame adapted to be attached to either side of said conveyor, whereby the latter may be mounted for swinging movement on either side of said frame, a horizontally disposed drive shaft for driving said buckets, said shaft being supported at each side of the frame, and driving means for said conveyor including a rotatable member journaled on said pivot frame and adapted to engage either end of said shaft, according to the side of the frame on which said pivot frame is pivoted.

9. An elevator comprising a vertically disposed frame, a vertical series of interconnected elevator buckets movably supported thereby, means for driving said buckets including a longitudinally disposed drive shaft journaled at each side of the frame, a receiving hopper including conveyor mechanism swingable to a position in front of said frame for discharging into said buckets from the front thereof, means pivotally connecting said hopper with said frame including a pivot frame symmetrical with respect to its longitudinal axis and adapted to be connected at one end with either side of said hopper and having at its other end a vertically disposed pipe member, and bracket means adapted to be disposed at either side of said frame, corresponding to the side of the hopper to which said pivot frame is connected, said bracket means receiving said pipe member and defining the vertical axis of swinging for said hopper.

10. An elevator comprising a vertically disposed frame, a vertical series of interconnected elevator buckets movably supported thereby, means for driving said buckets including a longitudinally disposed drive shaft journaled at each side of the frame, a receiving hopper including conveyor mechanism and swingable to a position in front of said frame for discharging into said buckets, means pivotally connecting said hopper with said frame including a pivot frame symmetrical with respect to its longitudinal axis and adapted to be connected at one end with either side of said hopper and having at its other end a vertically disposed pipe member, bracket means adapted to be disposed at either side of said frame, corresponding to the side of the hopper to which said pivot frame is connected, said bracket means receiving said pipe member and defining the vertical axis of swinging for said hopper, and means for driving said conveyor from said drive shaft when the hopper is disposed in front of said frame, said means including a rotatable member adapted to be operatively engaged with either end of said drive shaft and a supporting member for said rotatable member, said supporting member being symmetrical about its longitudinal axis and having means for receiving said rotatable member at one end and connected at its other end with said pipe member.

11. An elevator for grain and the like comprising a vertically disposed series of buckets, means serving as a vertically arranged frame therefor, a receiving hopper including a movable conveyor adapted to deliver grain to said buckets, means pivotally connecting the hopper to said frame at vertically spaced points, and means disposed substantially in the vertical plane passing through said pivot points for driving said conveyor.

12. An elevator for grain and the like comprising a vertically disposed series of buckets, means serving as a vertically arranged frame therefor, a receiving hopper including a movable conveyor adapted to deliver grain to said buckets, means including a generally vertically disposed frame connected with said hopper for pivotally connecting the latter with said elevator frame whereby said hopper is swingable to a position in front of said buckets, and means disposed substantially in the vertical plane of said frame for driving said conveyor.

13. An elevator for grain and the like comprising a vertically disposed frame, a vertical series of interconnected buckets supported in said frame, means for driving said buckets including a shaft journaled in each side of said frame, a receiving hopper including a horizontal conveyor, a generally vertically disposed supporting frame for said hopper including a part disposed at one side thereof and pivotally connected to one side of said frame, said hopper being swingable from a position at the side of said frame to a position in front thereof so as to discharge directly into said buckets, and means disposed substantially in the vertical plane of said hopper supporting frame for driving said conveyor and engageable with said driving shaft for said buckets when said hopper is swung into operative position in front of said frame.

14. An elevator for grain and the like comprising a vertically disposed series of buckets, means serving as a vertically arranged frame therefor, a hopper including a horizontal conveyor having a driving member therefor, means pivotally connecting said horizontal conveyor with said frame so as to discharge into the front of said buckets, means for driving the buckets, and driving means for the hopper including a second member driven by said bucket driving means and engageable with said first member for driving the latter and the horizontal conveyor when the hopper is swung into operative position in front of the elevator frame.

15. An elevator for grain and the like comprising a vertically disposed series of buckets, means serving as a vertically arranged frame therefor, a hopper pivotally connected with said frame and including a horizontal conveyor having a driving member therefor, means for driving said buckets, and driving means for the hopper including a second member, one of said members having at least one driving flange thereon and the other of said members having at least one cylindrical pin rotatably mounted thereon in a position to be engaged by the flange on said first member for driving the horizontal conveyor from the bucket driving means when the hopper is swung into operative position relative to the elevator frame, said rotatable cylindrical pin having rolling action with respect to said flange when said hopper is swung to operative position when said first and second members are out of axial alignment.

16. A crib elevator for grain and the like comprising means serving as a vertically disposed frame adapted to be rigidly secured to a wall of the crib, a vertical series of buckets supported by said frame, a receiving hopper, and means pivotally connecting said hopper for movement about a vertical axis, said connecting means being connected with said frame adjacent the rear thereof and adjacent said crib wall, whereby said hopper may be swung from a position substantially flat against said crib wall to a position at the front of the elevator for discharging material into the elevator.

17. A crib elevator for grain and the like comprising means serving as a vertically disposed frame adapted to be rigidly secured to a wall of the crib, a vertical series of buckets supported by said frame, a receiving hopper, and supporting means for connecting the inner end of said receiving hopper to said frame, said supporting means comprising sections arranged generally at right angles to one another, one section pivotally supporting the inner end of the receiving hopper and the other section being pivotally connected with the elevator frame adjacent the rear portion thereof and adjacent the wall of the crib to which the elevator is secured, whereby said supporting means at least partially embraces a portion of the elevator to dispose the receiving hopper in front of the elevator in one position and closely alongside the wall of the crib in another position and out of the way of the passageway in front of the elevator.

18. An elevator for grain and the like comprising a vertically disposed frame, a vertical series of buckets supported thereby, a hopper, and means pivotally connecting said hopper to one side of said frame adjacent the rear thereof whereby said hopper may be swung into a position to discharge grain into said buckets through the front side of said frame and may be swung laterally into an inoperative position to bring the then front side of the hopper into substantially the same plane with the front of the elevator frame to provide for maximum clearance at the front of the elevator when the latter is not in use.

19. An elevator for grain and the like comprising a vertically disposed frame, a vertical series of buckets supported thereby, a hopper, and an arm connected to the hopper at one side thereof and extending along one side of the elevator frame and pivotally connected thereto adjacent the rear thereof, whereby said hopper may be swung into a position to discharge grain into said buckets through the front side of said frame and may be swung laterally into an inoperative position to bring the then front side of the hopper into substantially the same plane with the front of the elevator frame to provide for maximum clearance at the front of the elevator when the latter is not in use.

20. An elevator for grain and the like comprising a generally vertically disposed frame, a vertical series of buckets supported thereby, a receiving hopper adapted to be disposed so as to discharge into the front of said frame, a supporting arm connected with the hopper and disposed adjacent one side thereof, and means pivotally connecting the inner end of said arm with said elevator frame at a point that is spaced rearwardly from the transverse plane of the front of the elevator an amount which is substantially equal to the perpendicular distance between the plane passing through the other side of said hopper and the axis of said pivot, whereby the plane of said other side of the hopper coincides substantially with the plane of the front of the elevator frame when the receiving hopper is swung to its inoperative position.

LEONARD B. NEIGHBOUR.